(12) United States Patent
Belitzer et al.

(10) Patent No.: US 9,954,626 B2
(45) Date of Patent: *Apr. 24, 2018

(54) CALIBRATING RF PATH DELAY AND IQ PHASE IMBALANCE FOR POLAR TRANSMIT SYSTEM

(71) Applicant: Intel IP Corporation, Santa Clara, CA (US)

(72) Inventors: Alexander Belitzer, Munich (DE); Bernhard Sogl, Unterhaching (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,379

(22) Filed: Aug. 8, 2016

(65) Prior Publication Data

US 2016/0352439 A1 Dec. 1, 2016

Related U.S. Application Data

(63) Continuation of application No. 14/575,733, filed on Dec. 18, 2014, now Pat. No. 9,413,583.

(51) Int. Cl.
*H04B 17/00* (2015.01)
*H04L 1/24* (2006.01)
(Continued)

(52) U.S. Cl.
CPC ......... *H04B 17/104* (2015.01); *H04H 20/12* (2013.01); *H04L 1/248* (2013.01); *H04L 7/033* (2013.01);
(Continued)

(58) Field of Classification Search
CPC ............... H04B 17/104; H04B 1/0475; H04B 2001/0425; H04B 2001/0433;
(Continued)

(56) References Cited

U.S. PATENT DOCUMENTS 7,545,874 B1 6/2009 Tang et al.
8,781,049 B1 7/2014 Belitzer
(Continued)

FOREIGN PATENT DOCUMENTS

| CN | 105721386 A | 6/2016 |
|---|---|---|
| TW | 201640869 A | 11/2016 |
| TW | I590627 B | 7/2017 |

OTHER PUBLICATIONS

"U.S. Appl. No. 14/575,733, Corrected Notice of Allowance dated Jul. 6, 2016", 2 pgs.
(Continued)

*Primary Examiner* — Michelle M Koeth
(74) *Attorney, Agent, or Firm* — Schwegman Lundberg & Woessner, P.A.

(57) ABSTRACT

A method of calibrating parameters for a polar transmitter (Polar TX) system includes receiving phase information derived from transmission information in a Polar TX for producing a radio frequency (RF) broadcast signal. An Inphase local oscillator (LO_I) signal and a quadrature phase local oscillator (LO_Q) signal are derived from a combination of a first signal and the phase information using a digital phase lock loop. A feedback receiver (FBR) receives the RF broadcast signal provided by the Polar TX. The LO_I signal and the LO_Q signal are mixed with the RF broadcast signal to obtain mixer output signals. RF path delay and IQ phase imbalance are concurrently determined as a function of the first signal and of the mixer output signals.

23 Claims, 8 Drawing Sheets

(51) Int. Cl.
  *H04L 27/36* (2006.01)
  *H04B 17/10* (2015.01)
  *H04H 20/12* (2008.01)
  *H04L 7/033* (2006.01)
  *H04W 72/04* (2009.01)
  *H04B 1/04* (2006.01)

(52) U.S. Cl.
  CPC .......... *H04L 27/361* (2013.01); *H04L 27/364* (2013.01); *H04W 72/0473* (2013.01); *H04B 1/0475* (2013.01); *H04B 2001/0425* (2013.01); *H04B 2001/0433* (2013.01)

(58) Field of Classification Search
  CPC ......... H04H 20/12; H04L 1/248; H04L 7/033; H04L 27/361; H04L 27/364; H04W 72/0473
  See application file for complete search history.

(56) References Cited

U.S. PATENT DOCUMENTS

| | | | | |
|---|---|---|---|---|
| 9,413,583 | B2* | 8/2016 | Belitzer | ............... H04L 27/361 |
| 2002/0181611 | A1* | 12/2002 | Kim | ..................... H04L 27/368 375/296 |
| 2002/0196864 | A1 | 12/2002 | Booth et al. | |
| 2003/0156658 | A1 | 8/2003 | Dartois | |
| 2007/0129025 | A1* | 6/2007 | Vasa | ................... H04B 1/0475 455/114.2 |
| 2007/0183532 | A1 | 8/2007 | Matero | |
| 2008/0007364 | A1 | 1/2008 | Chiba | |
| 2008/0064343 | A1 | 3/2008 | Lewis | |
| 2009/0156149 | A1 | 6/2009 | Plevridis et al. | |
| 2012/0319749 | A1* | 12/2012 | Thaller | ................... H03L 7/183 327/158 |
| 2013/0208770 | A1 | 8/2013 | Muhammad et al. | |
| 2013/0251069 | A1 | 9/2013 | Shute et al. | |
| 2014/0133528 | A1 | 5/2014 | Noest et al. | |
| 2016/0182162 | A1 | 6/2016 | Belitzer et al. | |

OTHER PUBLICATIONS

"U.S. Appl. No. 14/575,733, Non Final Office Action dated Oct. 15, 2015", 27 pgs.

"U.S. Appl. No. 14/575,733, Notice of Allowance dated Mar. 29, 2016", 10 pgs.

"U.S. Appl. No. 14/575,733, Response filed Feb. 3, 2016 to Non Final Office Action dated Oct. 15, 2015", 22 pgs.

"European Application Serial No. 15194792.6, Communication pursuant to Article 94(3) EPC dated Apr. 5, 2017", 7 pgs.

"European Application Serial No. 15194792.6, Extended European Search Report dated Apr. 18, 2016", 10 pgs.

"European Application Serial No. 15194792.6, Response filed Sep. 22, 2016 to Extended European Search Report dated Apr. 18, 2016", 21 pgs.

"Taiwanese Application Serial No. 104137529, Office Action dated Jan. 10, 2017", with English Translation, 16 pgs.

"Taiwanese Application Serial No. 104137529, Response filed Mar. 15, 2017 to Office Action dated Jan. 10, 2017", with English Translation, 11 pgs.

"European Application Serial No. 15194792.6, Response Filed Jun. 9, 2017 to Communication pursuant to Article 94(3) EPC dated Apr. 5, 2017", 16 pgs.

* cited by examiner

FIG. 7 ary <br>US 9,954,626 B2

CALIBRATING RF PATH DELAY AND IQ PHASE IMBALANCE FOR POLAR TRANSMIT SYSTEM

CROSS-REFERENCE TO RELATED APPLICATION

This application is a continuation of U.S. patent application Ser. No. 14/575,733, filed Dec. 18, 2014, which is incorporated by reference herein in its entirety.

TECHNICAL FIELD

The present subject matter generally relates to communication architectures and, in particular, to apparatus and methods for measuring radio frequency (RF) path signal delay and Inphase-Quadrature phase (IQ) phase imbalance in a polar transmitter (Polar TX) system.

BACKGROUND

Polar Transmitter (Polar TX) architectures are very attractive for modern radios because such architectures can provide improved area and power consumption characteristics compared with conventional analog architectures. One drawback to a polar system containing a Polar TX and a feedback receiver (FBR) system is that the phase modulation is not cancelled perfectly inside the FBR due to the inherent delay in the RF path, sometimes called RF delay path delay. When RF path delay is known, phase cancellation can be achieved by digital post processing. It is desirable to calibrate the RF path delay, and also be able to calibrate the IQ phase imbalance, in order to facilitate successful post processing.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An FBR with a modulated local oscillator (LO) should cancel the phase modulation and deliver only the amplitude demodulation of the RF signal. However, as a first problem, experience with Polar TXs and FBRs has shown that the phase modulation is not cancelled perfectly inside the FBR due to inherent RF path delay. When the RF path delay is known, the phase cancellation can be achieved by digital post-processing. But in order to accomplish this it is important to solve the first problem by knowing how to calibrate the RF path delay.

A second problem, the FBR has limited accuracy due to the IQ phase imbalance (i.e., non-perfect ninety degrees between the local oscillator for the Inphase (LO_I) and the local oscillator for the quadrature phase (LO_Q) signals. It is important to resolve the second problem by calibrating the IQ phase imbalance and, once the IQ phase imbalance is calibrated or known, compensating for it in the digital signal processing of the FBR.

Phase imbalance calibration is well known for a standard IQ receiver, where the LO signal is unmodulated. An external RF signal with a constant envelope modulation such as (RF_sig=cos(j*phi_RF+j*2*pi*F sin*t)) can be injected into the FBR input. At the same time the phase modulation of the internal LO signal can be disabled, and the transmitter output power can be disabled by switching off the power amplifier. By doing this the receiver behaves like a standard IQ receiver with an unmodulated LO. A disadvantage is that this method requires an external signal generator and is slower than desired since it involves control of on-chip components, and also control of chip-external components such as a signal generator. The disclosed method does not require an external device to be controlled. The complete procedure can be integrated on-chip.

Further, such RF path delay calibration is done in the lab by extensive measurements, storing the results in a non-volatile memory as a calibration data set. In this case, any deviation of RF delay from part to part in the production had to be budgeted.

Another approach for the calibration of the RF path delay required either dedicated hardware or complex calculations, storing the received samples inside RAM and perform cross-correlation or least-mean-square search and other techniques or hardware.

While the IQ phase imbalance requirement can be calibrated in an IQ-based architecture, as above, it has not been possible to apply such a calculation for polar architecture. Also until now, the IQ phase imbalance had to be achieved by a circuit design. This has drawbacks in current consumption and complexity. Further, the maximum frequency of the LO path was limited for previous calibration methods. The disclosed embodiments enable obtaining the RF path delay and the IQ phase imbalance at essentially the same time, thus saving calibration time. The RF path delay is a side-product of calibrating the IQ phase imbalance. Moreover, the calculation method for the embodiments is very simple, does not require additional hardware beyond the transmitter and the receiver, and can be applied even if no IQ phase imbalance calibration is required. The disclosed embodiments allow an increased IQ phase imbalance inside a LO path for FBR for a polar architecture. Further, the limitation of maximum frequency of the LO path for previous calibration methods can be relaxed by enabling calibration of IQ phase imbalance in a polar system as disclosed herein. Some embodiments are applicable to polar architectures, although the scope of the embodiments is not limited in this respect, as some embodiments may be applicable to other architectures including, but not limited to IQ architectures.

Figure 1:
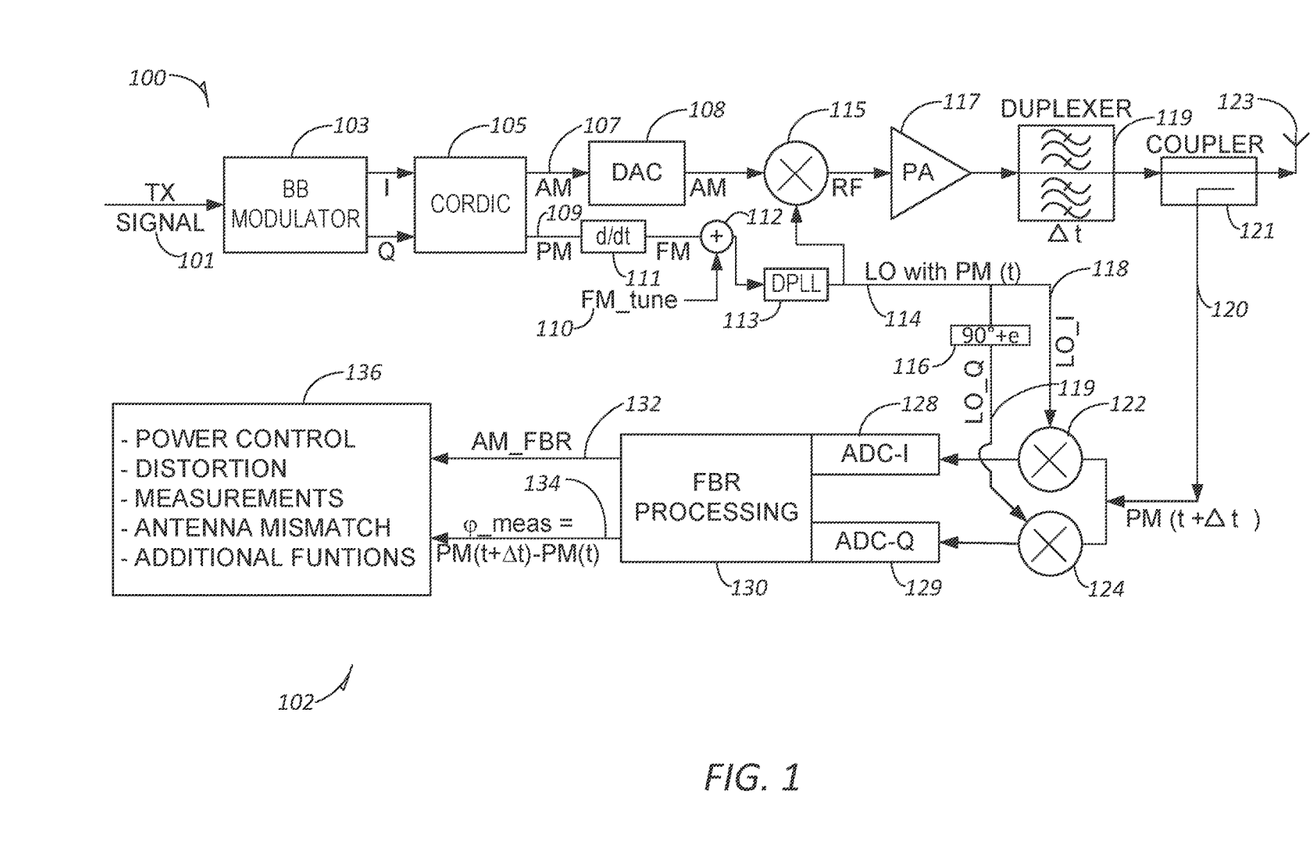
FIG. 1 illustrates an overview of a system containing a Polar TX and an FBR, according to an embodiment.

FIG. 1 illustrates an overview of a system comprising a Polar TX and an FBR. The Polar TX 100 can receive transmission information such as TX signal 101 in the form of polar symbols or polar information including amplitude information (A) and phase information (φ). In some examples, a baseband modulator 103 can provide the transmission information in Cartesian symbols (I, Q). The Polar TX 100 can include a coordinate rotation digital computer (CORDIC) 105 to translate the input Cartesian symbols (I, Q) to polar symbols, or information, designated as amplitude modulation and phase modulation (AM, PM) at 107, 109, respectively. Phase modulation PM may be referred to herein as phase information (φ).

In certain examples, the Polar TX 100 includes a phase processing path that includes digital phase lock loop (DPLL) 113 to provide the phase information of the carrier signal based on the phase information PM, or frequency information derived from the phase information PM via differentiator 111. In some embodiments, combiner 112 is included to allow a signal, FM_tune 110, discussed subsequently, to be injected in the system for use in RF path delay calibration and phase imbalance calculation.

The Polar TX 100 may also include an amplitude processing path beginning at 107 for amplitude information. AM information at 107 is converted to analog via digital to analog convertor (DAC) 108. In some examples, the phase processing path and the amplitude processing path can each include an interpolator circuit, not shown, for up-sampling or down-sampling the phase, frequency or amplitude information. In certain examples, the phase modulated carrier signal output from the DPLL 113 and the processed amplitude information from DAC 108 can be combined using the combiner 115 to provide an RF transmission signal for broadcast using the antenna 123. The radio transmission signal may be amplified in power amplifier 117. Duplexer 119 and coupler 121 may couple the RF transmission signal to the antenna 123. Duplexer 119 (or any kind of filter) introduces a signal propagation delay, referred to as Δt in FIG. 1, Δt symbolizing the RF path delay.

The FBR 102 includes line 120 for receiving RF signal PM (t+Δt) on line 120, which is coupled to mixers 122, 124. The LO_I signal from DPLL 113 is coupled to mixer 122 via line 118 while the LO_Q signal is coupled over line 119 to mixer 124. Item 116 symbolizes the fact that, as mentioned above, there is IQ phase imbalance, namely a non-perfect ninety degrees between the LO_I and the LO_Q signals, this IQ phase imbalance being indicated by the symbol "e" at 116, to be discussed subsequently. One possible and often used method to generate signals LO_Q and LO_I from the LO output of DPLL 113 is to use a frequency divider, not shown. The LO signal output of the DPLL 113 may be divided by 2 or 4. The output of this divider can generate LO_I at line 118 and a 90°-shifted (with error e) LO_Q signal at 119. Other methods may be used to achieve this signal separation of LO_I and LO_Q from the LO output signal from DPLL 113. The output of mixer 122 is the RF signal from line 120 (PM(t+Δt)) combined with the LO_I signal, and the output of mixer 124, is the RF signal from line 120 (PM (t+Δt)) combined with the LO_Q signal. Mixers 122 and 124 receive signals LO_I and LO_Q from DPLL 113 in order to frequency-shift the tapped transmit signal from line 120 to baseband frequency. The outputs of mixers 122 and 124 are respectively coupled to an ADC for Inphase information (ADC-I) 128 and an ADC for quadrature information (ADC-Q) 129. Each of ADC-I 128 and ADC-Q 129 is coupled to FBR processing circuitry 130. FBR processing circuitry 130 may include a CORDIC (not shown) that operates much like CORDIC 105 in that it converts the IQ representation of the tapped and down-mixed transmit signal to a polar representation having an amplitude component AM and a phase component PM, each of which are respectively shown as AM information signal AM_FBR 132 and phase information signal PM (t+Δt)−PM (t) 134. These signals may be used for FBR functions such as those listed at 136 for desired use. AM information AM_FBR 132 and phase information, PM (t+Δt)−PM(t) 134, are also used to calculate RF path delay and to calibrate IQ phase imbalance as discussed below.

Figure 2:
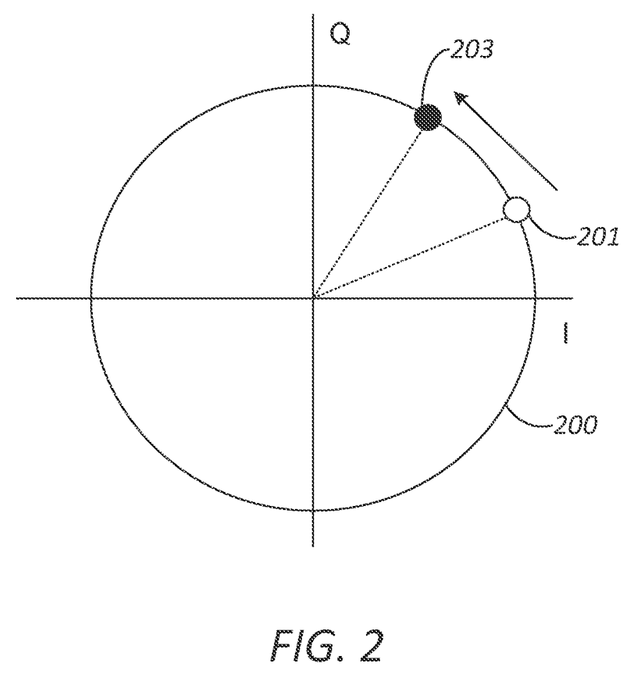
FIG. 2 illustrates an IQ constellation with a single point, according to an embodiment.

The disclosed implementation can be explained in terms of a well-known I/Q constellation diagram. The symbols on a constellation diagram may be represented as complex numbers and can be visualized as points on the complex plane. The real and imaginary axes are often called the In phase, or I-axis, and the Quadrature phase, or Q-axis, respectively. Plotting several symbols in a scatter diagram produces a constellation diagram with a number of points around the circle of the diagram. FIG. 2 illustrates an IQ constellation with a single point, according to an embodiment. This illustration is a specific example of a general constellation diagram and is helpful in understanding how the disclosed embodiments operate. Thus, any point in the constellation diagram of FIG. 2 will fall on a simple straight line on an IQ-diagram (to be discussed subsequently) if there is no RF path delay Δt. The constellation points of a general constellation diagram will, at the FBR input, be reduced to a single point as shown in FIG. 2, if the amplitude modulation is disabled (i.e., the points of the constellation diagram are just going in a circle). The position of the resulting point of FIG. 2 is therefore seen to be dependent on the RF path delay.

RF Path Delay

When an FM signal such as FM_tune 110 in FIG. 1 is inserted into the transmitter via combiner 112 in an embodiment, the output of DPPL 113 will include FM_tune as part of LO_Q and LO_I over lines 119 and 118, respectively.

The LO_I and LO_Q signals at 118 and 119, respectively, are combined via combiners 122 and 124, respectively, with the received RF input signal from antenna 123 on line 120. The output of the FBR may therefore be viewed as an IQ constellation with a single point. The position of this point depends on the RF path delay, which is to be calculated, and can be shifted around the circle 200 of FIG. 2, such as at 201, 203, if the RF delay is changed or if the modulation frequency is changed. The points on the circle 200 of FIG. 2 may be given by the following equations:

$$M\_point\_1 = (2 * \pi * f_{RF} * \Delta t) \qquad (1)$$

When no FM_tune is applied (i.e., at 201).

$$M\_point\_2 = (2 * \pi * f_{RF} * \Delta t) + (2 * \pi * FM\_tune * \Delta t) \qquad (2)$$

When FM_tune is applied (i.e., at 203).

$$delta\_M = M\_point\_2 - M\_point\_1 \qquad (3)$$

Out of these equations Δt can be calculated as:

$$\Delta t = delta\_M / (2 * \pi * FM\_tune) \qquad (4)$$

Where Δt is the RF path delay

IQ Phase Imbalance

Figure 4A:
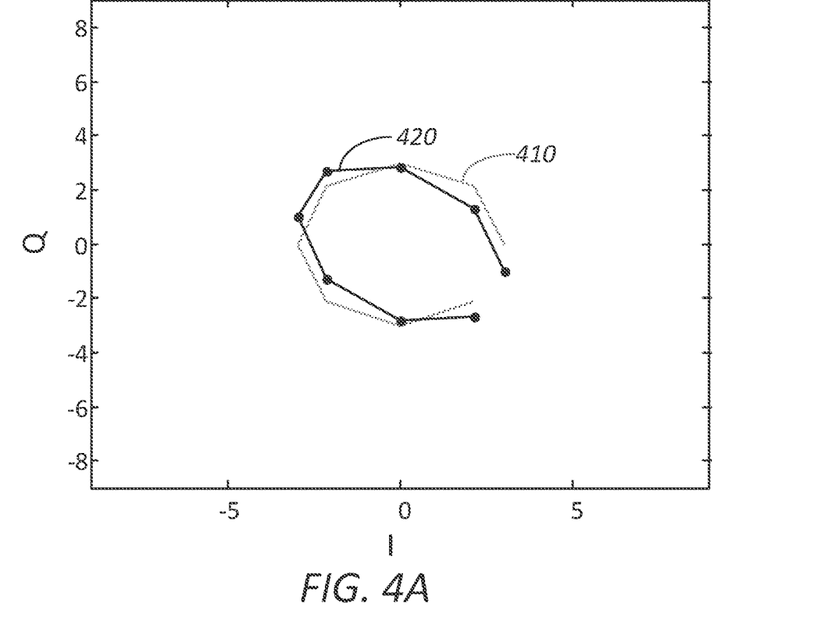
FIG. 4A is a representation of the constellation diagram of FIG. 2 both with and without phase error, according to an embodiment
Figure 4B:
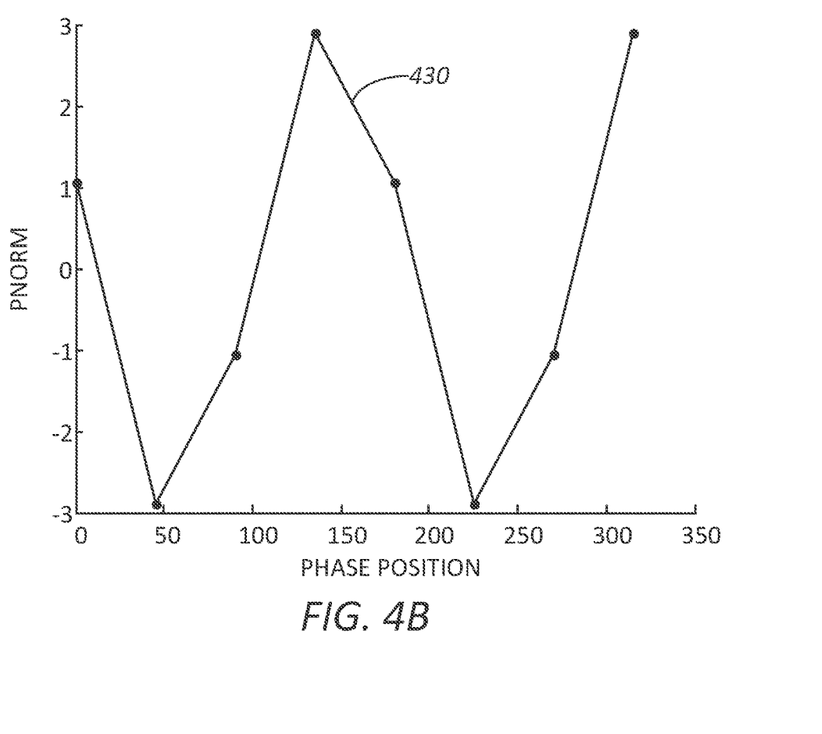
FIG. 4B illustrates the deviation of the amplitude squared from the average amplitude squared, in terms of receiver power, according to an embodiment

FIG. 4A is a representation of the constellation diagram of FIG. 2 both with and without phase error, according to an embodiment. The constellation diagram without IQ phase error is seen at 410 of FIG. 4A, while the effects of phase error is seen at 420, where the I/Q phase is not precisely ninety degrees. FIG. 4B illustrates the deviation of the amplitude signal squared from the average amplitude signal squared, in terms of receiver power, according to an embodiment. Power is discussed with respect to Equations (5)-(9) below) for points on curve 420 of FIG. 4A.

Figure 3:
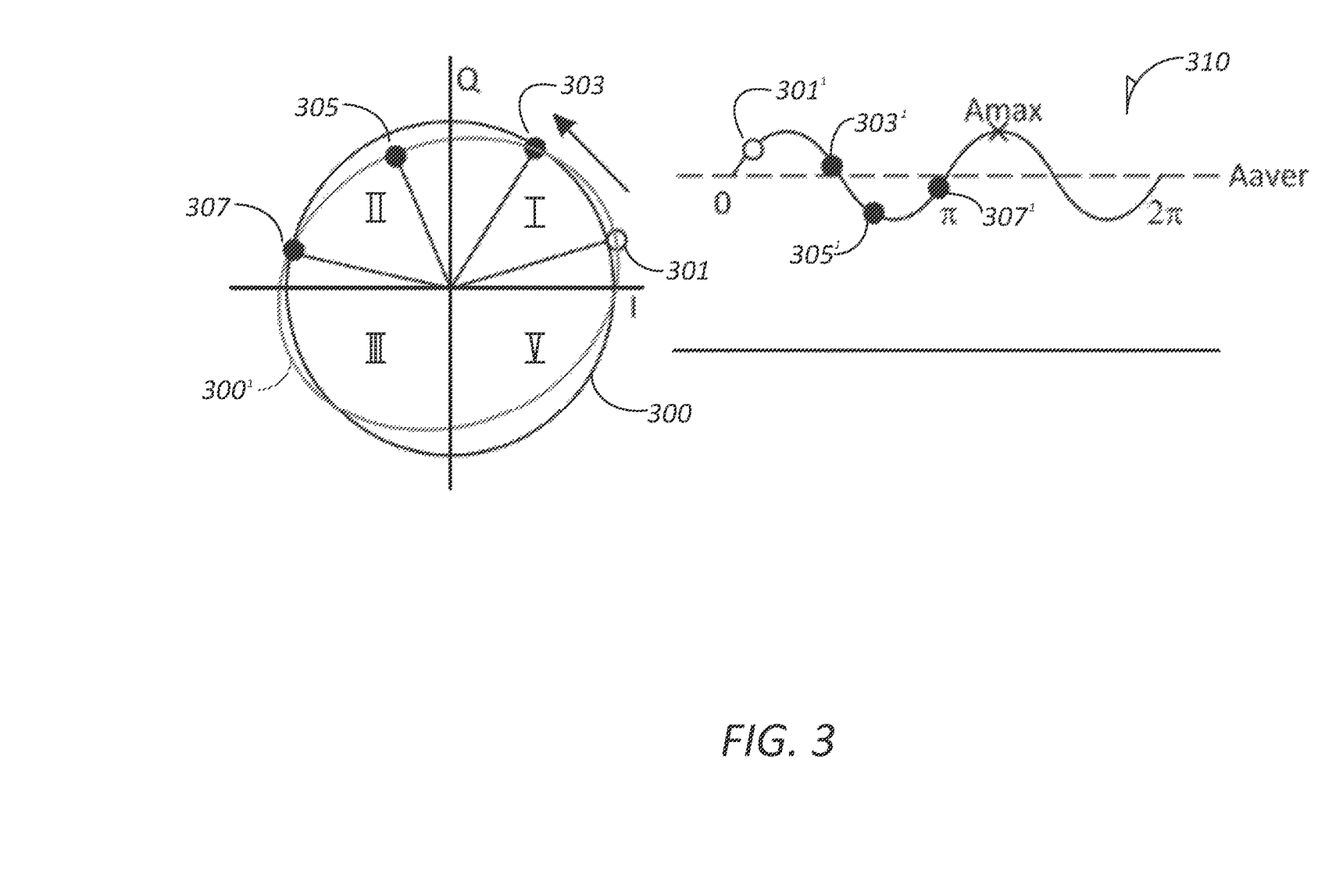
FIG. 3 is an illustration of the effect of IQ phase imbalance on the IQ constellation diagram of FIG. 2, according to an embodiment.

FIG. 3 is an illustration of the effect of IQ phase imbalance on the IQ constellation diagram of FIG. 2, according to an embodiment. The IQ phase imbalance makes an ellipse out of the IQ constellation circle 200 of FIG. 2. This ellipse effect is seen in FIG. 3 where circle 300 becomes ellipse $300^1$. When the FM_tune signal injected at 110 is increased, and the amplitude A of signal 310 may be monitored, which may be at point 132 in FIG. 1. The amplitude is seen to become a sinus-like trajectory 310 about the average amplitude $A_{aver}$ in FIG. 3, where points $301^1$, $303^1$, $305^1$ and $307^1$ correspond to points 301, 303, 305, and 307. A 45° rotation of the measured points can be achieved by proper selection of FM_tune. Increasing the FM_tune will, in the described embodiment, lead to a rotation of the measured point counterclockwise, decreasing the FM_tune will lead to a clockwise shift of the measured point. The FM_tune may be tuned and the phase of the new point may be compared to the last measured point. This should be repeated until 45 degree shift between the points is achieved. This procedure is illustrated in the loop at 520, 530, 540 and 550 in FIG. 5, discussed below. This would give, in FIG. 3, a whole period of the amplitude signal after 4 measurement points $A_n$ with n=1 . . . 4, symbolized at points 301, 303, 305, and 307, respectively. The IQ phase imbalance |e|, seen symbolically as a divergence from ninety degrees at 116 of FIG. 1, can be calculated out of these 4 measured amplitude points. The sign of the phase imbalance is given by the comparison of the $A_n$ measured at quadrant I or III of FIG. 3. The sign may be named ($A_{n\_}$equal_IQsign) with the $A_n$ measured at quadrant II or IV of FIG. 3 being named (=$A_{n\_}$nonequal_IQsign). If An_equal_IQsign is greater than An_nonequal_IQsign, then the phase error e was a positive number, otherwise negative. The formula for calculating the magnitude |e| is:

$$P_{aver} = \frac{1}{4}\sum_{n=1}^{4} A_n^2 \quad (5)$$

$$P_{norm1} = A_{n=1}^2 - P_{aver} \quad (6)$$

$$P_{norm2} = A_{n=2}^2 - P_{aver} \quad (7)$$

$$P_{max} = \sqrt[2]{P_{norm1}^2 + P_{norm2}^2} \quad (8)$$

$$|e| \approx \frac{P_{max}}{P_{aver}} \quad (9)$$

The phase calculation is not precise for bigger phase errors. In order to simplify the mathematics the A cos and A sin functions were avoided, but the accuracy remains better than 0.5°, which is sufficient for phase imbalances smaller than 20°.

Figure 4C:
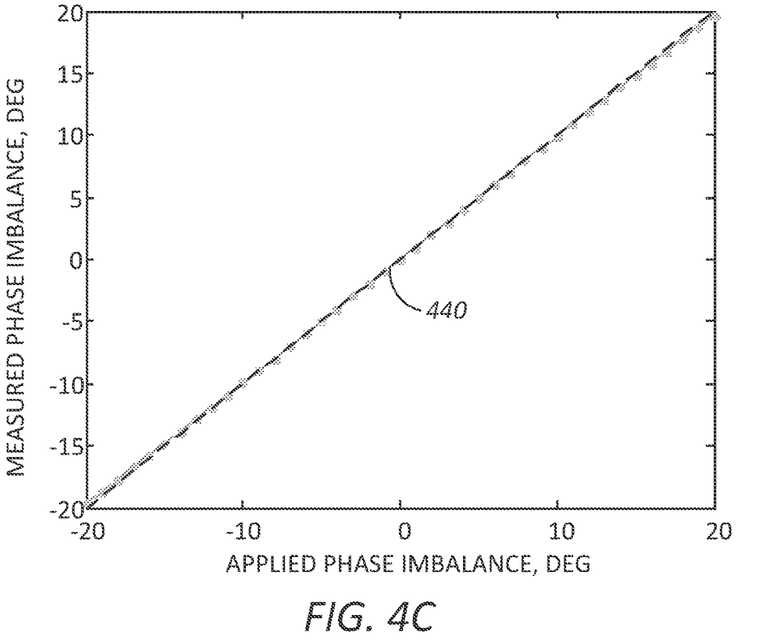
FIG. 4C illustrates a phase imbalance detector characteristic, according to an embodiment.
Figure 4D:
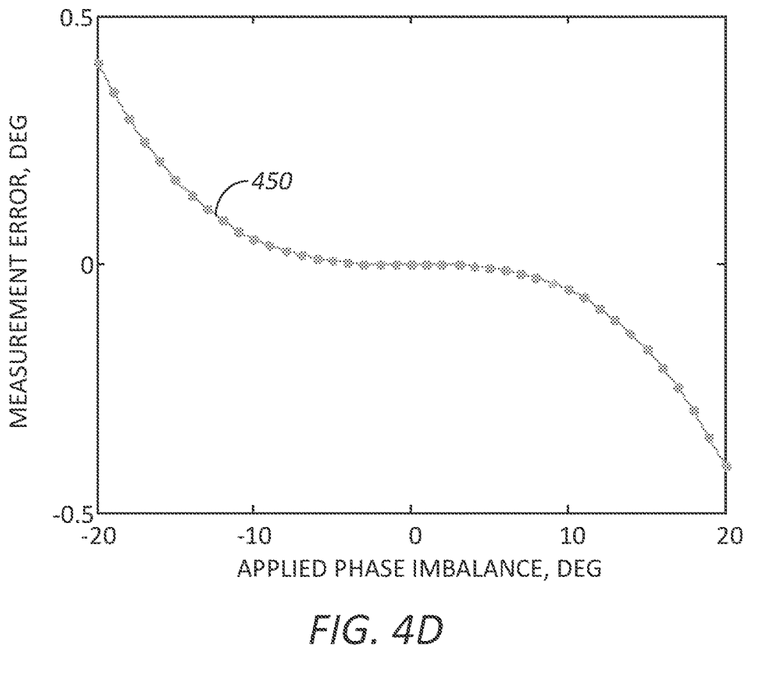
FIG. 4D illustrates the accuracy of detected phase imbalance, according to an embodiment.
Figure 5:
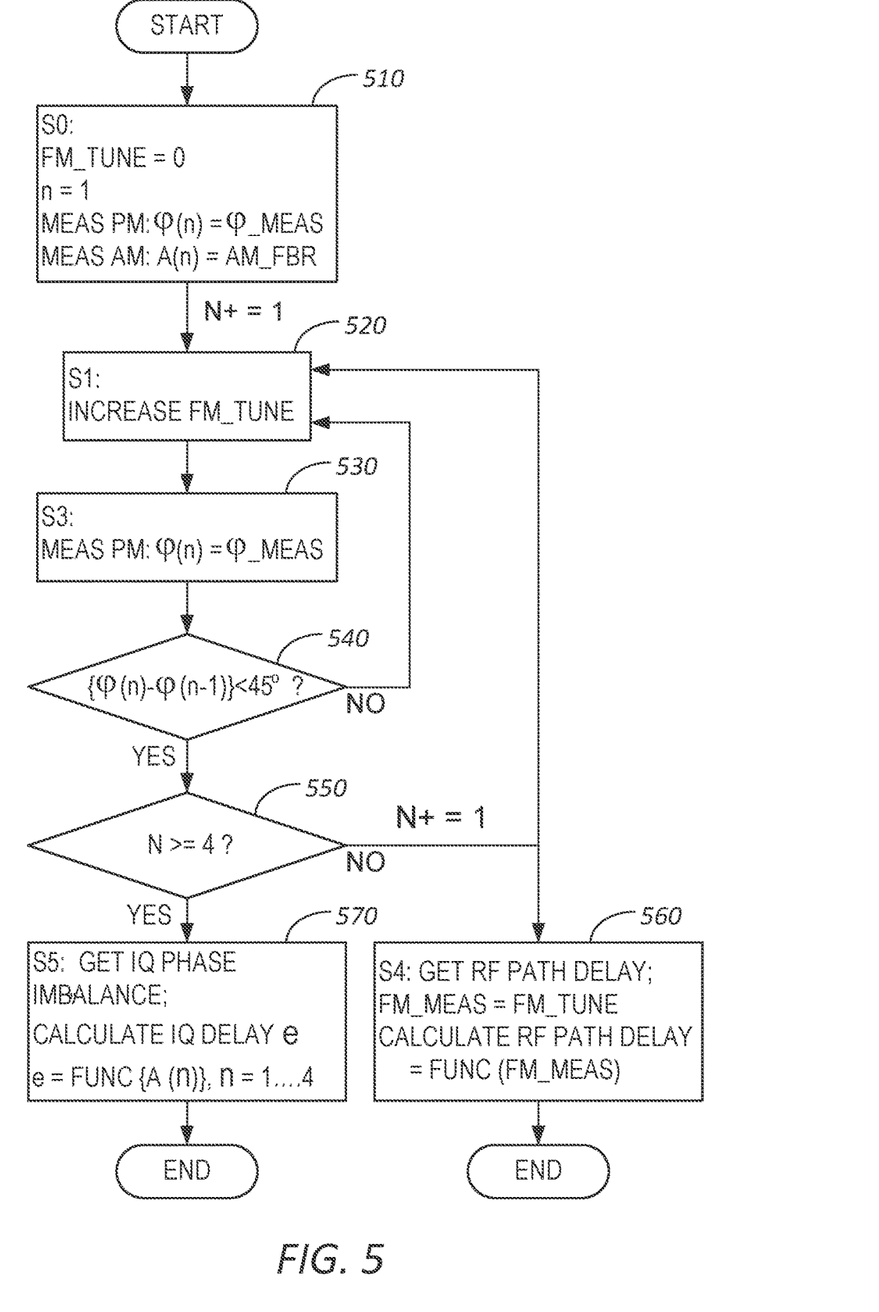
FIG. 5 is a flow chart illustrating a method using various measurements to provide RF path signal delay and IQ phase imbalance, according to an embodiment.

FIG. 4C illustrates a phase imbalance detector characteristic, according to an embodiment, while FIG. 4D illustrates the accuracy of the detected phase imbalance, according to an embodiment. The accuracy may be seen from FIGS. 4C and 4D. Phase imbalance has been measured to determine accuracy of the above method. As illustrated in FIG. 4C, the measured phase imbalance in degrees is very close to the applied phase imbalance in degrees. Laboratory measurements have shown the error to be within 0.5°. FIG. 4D illustrates measurement error as a function of applied phase imbalance FIG. 5 is a flow chart illustrating a method using various measurements to provide the RF path delay and the IQ phase imbalance, according to an embodiment. At 510 the signal FM_tune at 110 of FIG. 1 is set to zero and measurements of phase modulation and amplitude modulation are taken at 132, 134, respectively, of FIG. 1. This is taken at n=1 $301^1$ of FIG. 3) and N is then increased by 1 such that n=2 and FM_tune is increased at 520. At 530 the phase modulation information is measured as at 134 of FIG. 1. This is the measurement n=2 $303^1$ of FIG. 3). At 540 a test is taken to determine whether the difference in phase measurements is less than forty-five degrees. If the answer is NO, then the FM_tune signal is increased at 520 and the process continues. If the answer is YES, then a test is made to determine whether N is equal to or greater than 4. If the answer is NO, then N is increased by 1 and the process continues at 520. At the same time, the RF delay can be calculated at 560 using Equations (1) through (4), above. This calculation need be taken only the first time the NO answer to test 550 is taken, and the RF delay is valid regardless of the number of times the loop 520, 530, 540, 550 is performed.

The loop 520, 530, 540, 550 is continued until the answer at test 550 is YES. When the YES decision is taken, at 570 the magnitude |e| of the IQ phase imbalance may be calculated using Equations (5) through (9). The phase error |e| will be positive if An_equal_IQsign>An_nonequal_IQsign, otherwise negative, as discussed above. The determined RF path delay and IQ phase imbalance at 560 and 570, respectively, may be used for correction purposes as discussed above. Although the parameters may be determined independently and/or concurrently, this is not a requirement and the scope of the embodiments is not limited in this respect.

Figure 6:
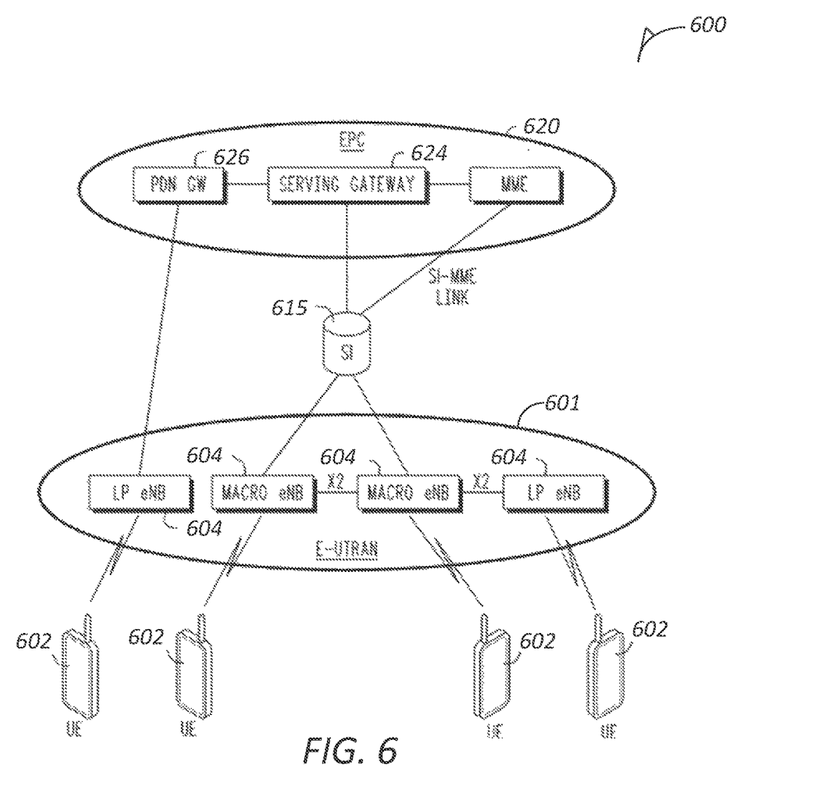
FIG. 6 is a functional diagram of a portion of an end-to-end network architecture of an LTE network in accordance with some embodiments.

FIG. 6 shows a portion of an end-to-end network architecture of an LTE network with various components of the network in accordance with some embodiments. The network 600 comprises a radio access network (RAN) (e.g., as depicted, the E-UTRAN or evolved universal terrestrial radio access network) 601 and the core network 620 (e.g., shown as an evolved packet core (EPC)) coupled together through an S1 interface 615. For convenience and brevity sake, only a portion of the core network 620, as well as the RAN 600, is shown.

The core network 620 includes mobility management entity MME, serving gateway (serving GW) 624, and packet data network gateway (PDN GW) 626. The RAN includes enhanced node B's (eNBs) 604 (which may operate as base stations) for communicating with user equipment (UE) 602. The eNBs 604 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 624 terminates the interface toward the RAN 600, and routes data packets between the RAN 600 and the core network 620. In addition, it may be a local mobility anchor point for inter-eNB handovers and also may provide an anchor for inter-3GPP mobility. Other responsibilities may include lawful intercept, charging, and some policy enforcement.

The serving GW 624 and the MME may be implemented in one physical node or separate physical nodes. The PDN GW 626 terminates an SGi interface toward the packet data network (PDN). The PDN GW 626 routes data packets between the EPC 620 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 626 and the serving GW 624 may be implemented in one physical node or separated physical nodes.

The eNBs 604 (macro and micro) terminate the air interface protocol and may be the first point of contact for a UE 602. In some embodiments, an eNB 604 may fulfill various logical functions for the RAN 600 including but not limited to RNC (radio network controller functions) such as radio bearer management, uplink and downlink dynamic radio resource management and data packet scheduling, and mobility management. In accordance with embodiments, UEs 602 may be configured to communicate OFDM communication signals with an eNB 604 over a multicarrier communication channel in accordance with an OFDMA communication technique. The OFDM signals may comprise a plurality of orthogonal subcarriers.

The S1 interface 615 is the interface that separates the RAN 600 and the EPC 620. It is split into two parts: the S1-U, which carries traffic data between the eNBs 604 and the serving GW 624, and the S1-MME, which is a signaling interface between the eNBs 604 and the MME. The X2 interface is the interface between eNBs 604. The X2 interface comprises two parts, the X2-C and X2-U. The X2-C is the control plane interface between the eNBs 604, while the X2-U is the user plane interface between the eNBs 604.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 626. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 602 (FIG. 6). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L,=1, 2, 4, or 8).

Figure 7:
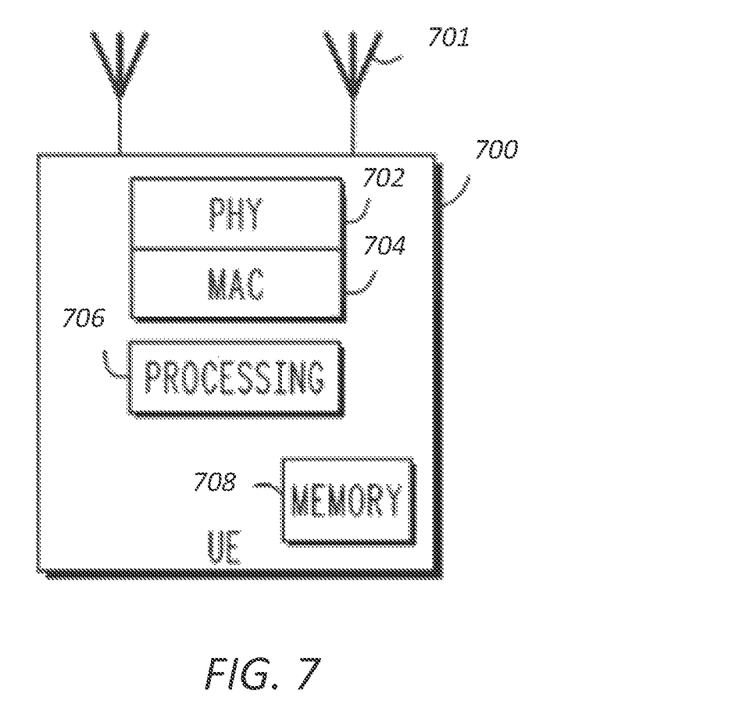
FIG. 7 illustrates a functional block diagram of user equipment (UE) in accordance with some embodiments.

FIG. 7 illustrates a functional block diagram of a UE in accordance with some embodiments. The UE 700 may be suitable for use as any one or more of the UEs 602 illustrated in FIG. 6. The UE 700 may include physical layer circuitry 702 for transmitting and receiving signals to and from eNBs 604 (FIG. 6) using one or more antennas 701. UE 700 may also include medium access control layer (MAC) circuitry 704 for controlling access to the wireless medium. UE 700 may also include processing circuitry 706 and memory 708 arranged to configure the various elements of the UE to perform the operations described herein.

In accordance with some embodiments, the MAC circuitry 704 may be arranged to contend for a wireless medium configure frames or packets for communicating over the wireless medium and the LTE physical layer (PHY) circuitry 702 may be arranged to transmit and receive signals. The PHY 702 may include circuitry for modulation/demodulation, upconversion/downconversion, filtering, amplification, etc. In some embodiments, the processing circuitry 706 of the device 700 may include one or more processors. In some embodiments, two or more antennas may be coupled to the physical layer circuitry arranged for sending and receiving signals. The physical layer circuitry may include one or more radios for communication in accordance with cellular (e.g., LTE) and WLAN (e.g., IEEE 802.11) techniques. The memory 708 may be store information for configuring the processing circuitry 706 to perform operations for configuring and transmitting HEW frames and performing the various operations described herein.

In some embodiments, the UE 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 700 may include one or more of a keyboard, a display, a non-volatile memory port, multiple antennas, a graphics processor, an application processor, speakers, and other mobile device elements. The display may be an LCD screen including a touch screen.

The one or more antennas 701 utilized by the UE 700 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

Although the UE 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 700 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 700 and the eNBs may be configured to communicate in accordance with an orthogonal frequency division multiple access (OFDMA) technique.

Examples and Additional Notes

In Example 1, a method of calibrating a transmitter system parameters can include receiving phase ($\varphi$) information derived from transmission information in a transmitter, deriving an Inphase local oscillator (LO_I) signal and a quadrature phase local oscillator (LO_Q) signal from a combination of a first signal, which may be or include a tuning signal, and the ($\varphi$) information, or a function of the $\varphi$ information, receiving an RF signal provided by the transmitter, mixing the LO_I signal and the LO_Q signal with the RF signal to obtain mixer output signals, and determining, as a function of the mixer output signals, the RF path delay and the IQ phase imbalance caused by the Polar TX.

In Example 2, the method of Example 1 optionally includes the transmitter being a polar transmitter (Polar TX) including a phase lock loop (PLL), deriving at least AM information from at least one of the mixer output signals, and concurrently determining the RF path delay and the IQ phase imbalance by varying the first signal and measuring variation of the derived AM information as the first signal is varied.

In Example 3, any one or more of Examples 1-2 optionally includes deriving at least AM information, and the variation of the AM information can comprise a substantially sinusoid function or a near-sinusoid function.

In Example 4, deriving AM information from at least one of the mixer output signals of any one or more of Examples 1-3 optionally includes coupling the mixer output signals to a CORDIC and obtaining the AM information as an output from the CORDIC.

In Example 5, determining the RF path delay of any one or more of Examples 1-4 optionally includes calculating the difference in amplitude of the substantially sinusoid function at two points of variation of the first signal and dividing the difference by a function of the first signal.

In Example 6, the first signal of any one or more of Examples 1-5 can optionally comprise an FM signal (FM_tune), and determining the RF path delay can optionally include calculating:

$$RF\ Path\ Delay =$$

$$\Delta t = \frac{[(2 * \pi * f_{RF} * \Delta t) - ((2 * \pi * f_{RF} * \Delta t) + (2 * \pi * FM\_tune * \Delta t))]}{(2 * \pi * FM\_tune)}$$

where $f_{RF}$ is the frequency of the RF signal, and

FM_tune is the magnitude of FM_tune at each the two points.

In Example 7, the determining the IQ phase imbalance of any one or more of Examples 1-6 optionally includes increasing the value of FM_tune in four discrete points for a full period of the AM information, measuring the AM information as a function of each point, and calculating the magnitude |e| of the phase imbalance in terms of power as:

$$P_{aver} = \frac{1}{4}\sum_{n=1}^{4} A_n^2$$

$$P_{norm1} = A_{n=1}^2 - P_{aver}$$

$$P_{norm2} = A_{n=2}^2 - P_{aver}$$

$$P_{max} = \sqrt[2]{P_{norm1}^2 + P_{norm2}^2}$$

$$|e| \approx \frac{P_{max}}{P_{aver}}$$

where $A_n$ is the amplitude of the AM information at discrete point n.

In Example 8, the determining the IQ phase imbalance of any one or more of Examples 1-7 can optionally include calculating the sign of the IQ phase imbalance by comparing $A_n$ measured at sequential quadrants of a constellation diagram for the variation of the AM information.

In Example 9, the (LO_I) signal and the (LO_Q) signal of any one or more of Examples 1-8 can optionally be derived using an analog phase lock loop or a digital phase lock loop.

In Example 10, the RF signal that is provided by the Polar TX in any one of Examples 1-9 can optionally be received by a feedback receiver (FBR).

In Example 11, polar transmitter (Polar TX) system can include a Polar TX comprising a radio frequency digital to analog converter (RFADC) configured to receive phase modulation information and processed amplitude information and to provide a radio frequency transmission signal for broadcast using an antenna and a phase lock loop (PLL) configured to receive both a function of the phase information and a first signal, and to provide a function of the phase modulation information, an Inphase local oscillator (LO_I) signal and a quadrature phase local oscillator (LO_Q) signal, and a feedback receiver (FBR) comprising a plurality of mixers to mix the provided radio frequency transmission signal with the (LO_I) signal and the (LO_Q) signal to obtain mixer output signals, and measuring circuitry configured to concurrently determine, as a function of the mixer output signals, the RF path delay and the IQ phase imbalance caused by the Polar TX.

In Example 12, the Polar TX system of he measuring circuitry of Example 11 can optionally derive at least AM information from at least one of the mixer output signals, and can optionally concurrently determine the RF path delay and the IQ phase imbalance by varying the first signal and measuring the variation of the AM information as the first signal is varied.

In Example 13, the variation of the AM information of any one or more of Examples 11-12 can optionally be a substantially sinusoid function or sinusoid-like function.

In Example 14 the deriving AM information from at least one of the mixer output signals of any one or more of Examples 11-13 can optionally include coupling the mixer output signals to a coordinate rotation digital computer (CORDIC) and obtaining the AM information as an output from the CORDIC.

In Example 15 the determining the RF path delay of any one or more of Examples 11-14 can optionally include calculating the difference in amplitude of the substantially sinusoid or sinusoid-like function at two points of variation of the first signal and dividing the difference by a function of the first signal.

In Example 16 the first signal of any one or more of Examples 11-15 can optionally be or include an FM signal (FM_tune), and determining the RF path delay can optionally include calculating:

$$RF\ Path\ Delay =$$

$$\Delta t = \frac{[(2*\Pi*fRF*\Delta t) - ((2*\Pi*fRF*\Delta t) + (2*\Pi*FM\_tune*\Delta t))]}{(2*\Pi*FM\_tune)}$$

where fRF is the frequency of the RF signal, and

FM_tune is the magnitude of FM_tune at each the two points.

In Example 17, determining the IQ phase imbalance of any one or more of Examples 11-17 can optionally include increasing the value of FM_tune in four discrete points for a full period of the AM signal, measuring the AM information as a function of each point, and calculating the magnitude |e| of the phase imbalance in terms of power as:

$$P_{aver} = \frac{1}{4}\sum_{n=1}^{4} A_n^2$$

$$P_{norm1} = A_{n=1}^2 - P_{aver}$$

$$P_{norm2} = A_{n=2}^2 - P_{aver}$$

$$P_{max} = \sqrt[2]{P_{norm1}^2 + P_{norm2}^2}$$

$$|e| \approx \frac{P_{max}}{P_{aver}}$$

where An is the amplitude of the AM information at point n.

In Example 18, the sign of the IQ phase imbalance of any one or more of Examples 11-17 cam optionally be calculated by comparing An measured at sequential quadrants of a constellation diagram for the variation of the AM information.

In Example 19, the comparing of any one or more of Examples 11-18 can optional be or include a subtraction process.

In Example 20, wherein the RF signal provided by the Polar TX of any one or more of Examples 11-19 can optionally be received by the (FBR).

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A feedback receiver (FBR) configured to receive a radio frequency (RF) transmission signal that is fed back to the FBR from a transmitter (TX) that is associated with the FBR, the FBR comprising:
   a plurality of mixers configured:
   to mix the RF transmission signal with an inphase local oscillator (LO_I) signal and a quadrature phase local oscillator (LO_Q) signal,
   the RF transmission signal comprising amplitude modulation (AM) information and phase information derived from a baseband signal, and
   the LO_I signal and the LO_Q signal derived from a signal comprising a combination of both the phase information and a variable first signal that is injected into the TX, and that is configured to be varied for measurement of the AM information and the phase information, and for calculation of RF path delay and IQ phase imbalance, and to obtain a plurality of mixer output signals based on the RF transmission signal, the LO signal, and the LO_Q signal;
   processing circuitry configured to measure, responsive to the variation of the variable first signal, the AM information and the phase information from the plurality of mixer output signals; and
   measuring circuitry configured to concurrently calculate the RF path delay as a function of variation of the variable first signal and calculate the IQ phase imbalance as a function of the amplitude of the variable first signal as the variable first signal is varied.

2. The FBR of claim 1 wherein the measuring circuitry monitors at least one of the measured AM information and the measured phase information to concurrently determine the RF path delay and the IQ phase imbalance as a function of the monitored at least one measured information, the plurality of mixer output signals, and the varied first signal.

3. The FBR of claim 1 wherein the variable first signal is injected into the transmitter by circuitry configured to combine the variable first signal with a function of the phase information of a modulated baseband signal.

4. The FBR of claim 1 wherein the concurrent calculation of the RF path delay and the IQ phase imbalance comprises calibration of the RF path delay.

5. The FBR of claim 1 wherein the AM information is periodic, the variable first signal is an FM signal (FM_tune) comprising a sinusoid, and calculation of the IQ phase imbalance comprises variation of the value of FM_tune in a plurality of discrete points for a full period of the AM information, measurement of the AM information as a function of each of the plurality of discrete points, and calculation of the magnitude |e| of the IQ phase imbalance as a function of FBR power.

6. The FBR of claim 5 wherein the LO_Q signal is a delayed version of the LO_I signal and the delay is ninety degrees plus the IQ phase imbalance, wherein the magnitude |e| of the IQ phase imbalance that is calculated as the function of FBR power is approximately the maximum power of the FBR divided by the average power of the FBR, for phase imbalances that are smaller than 20 degrees.

7. The FBR of claim 1 wherein the variable first signal comprises a sinusoid, and the RF path delay is calculated as the difference in amplitude at two points of variation of the AM information divided by the variable first signal.

8. A method of calibrating parameters in a polar transmitter (polar TX) system wherein a radio frequency (RF) transmission signal is fed back to a feedback receiver, (FBR) the method comprising:
   receiving the RF transmission signal provided by the polar TX, the RF transmission signal comprising amplitude modulation (AM) information derived from a baseband signal, and also comprising phase information derived from the baseband signal;
   deriving an inphase (I) local oscillator (LO_I) signal and a quadrature phase (Q) local oscillator (LO_Q) signal from a combination of both the received phase information and a variable first signal, the variable first signal configured to be varied for measurement of the AM information and the phase information, and for calculation of RF path delay and IQ phase imbalance;
   mixing the LO_I signal and the LO_Q signal with the RF transmission signal to obtain mixer output signals;
   responsive to variation of the variable first signal, processing the mixer output signals to measure the AM information and the phase information; and
   processing the measured AM information and phase information to calculate the RF path delay as a function of the variation of the variable first signal, and calculate the IQ phase imbalance as a function of the amplitude of the variable first signal as the variable first signal is varied.

9. The method of claim 8 wherein the phase information comprises delayed phase information, and the calculated RF path delay and IQ phase imbalance is a function of a monitored amplitude of the measured AM information and of the varied first signal.

10. The method of claim 8 wherein the variable first signal is injected into the polar transmitter by a combiner that is configured to combine the variable first signal with a function of the phase information that is derived from a baseband signal in the polar TX.

11. The method of claim 8 wherein an RF digital to analog converter receives the amplitude modulation information and provides a component of the RF transmission signal provided by the polar TX.

12. The method of claim 8 wherein a plurality of mixers is configured to mix the LO_I signal and the LO_Q signal with the received RF transmission signal to provide the mixer output signals, wherein the mixer output signals are processed to obtain the phase information and the AM information for measurement, as the variable first signal is varied to concurrently determine the RF path delay and the IQ phase imbalance.

13. The method of claim 12 wherein the AM information is periodic, the variable first signal is a variable FM signal (FM_tune) comprising a sinusoid, and calculating the IQ phase imbalance comprises varying the value of FM_tune in a plurality of discrete points for a full period of the AM information, measuring the AM information as a function of each of the plurality of discrete points, and calculating the magnitude |e| of the IQ phase imbalance as a function of FBR power.

14. The method of claim 13 wherein the LO_Q signal is a delayed version of the LO_I signal and the delay is ninety degrees plus the IQ phase imbalance, wherein the magnitude |e| of the IQ phase imbalance that is calculated as the function of FBR power is approximately the maximum power of the FBR divided by the average power of the FBR, for phase imbalances that are smaller than 20 degrees.

15. The method of claim 13 wherein the RF path delay is determined as the difference in amplitude at two points of variation of the AM information divided by a function of the variable first signal.

16. A polar transmitter (polar TX) comprising:
a radio frequency (RF) digital to analog converter (RF-DAC) configured to receive processed baseband information and provide amplitude modulation (AM) information as a first component of an RF transmission signal for broadcast; and
oscillator circuitry configured to receive a signal that comprises a combination of both phase modulation information of a baseband signal and a variable first signal that is configured to be varied for measurement of the AM information and the phase modulation information, and for calculation of RF path delay and IQ phase imbalance, and to provide an Inphase local oscillator (LO_I) signal, and a quadrature phase local oscillator (LO_Q) signal as an input to a feedback receiver (FBR),
wherein the polar TX is configured to provide the RF transmission signal to the FBR to determine both the RF path delay of the FBR and the IQ phase imbalance of the FBR, each as a function of at least one signal that results from a mixing of the RF transmission signal with the LO_I signal and the LO_Q signal as the variable first signal is varied over a sinusoidal period of the variable first signal to measure the AM information and the phase information.

17. The polar TX of claim 16 wherein the mixing is performed by a plurality of mixers configured to mix the radio frequency transmission signal with the LO_I signal and the LO_Q signal and provide a plurality of mixer output signals.

18. The polar TX of claim 17 wherein the plurality of mixer output signals are processed to derive the AM information and the phase modulation information from the plurality of mixer output signals, and wherein the AM information and the phase modulation information are measured as the variable first signal is varied, to concurrently determine the RF path delay of the FBR as a function of the variable first signal, and the IQ phase imbalance of the FBR as a function of the measured AM modulation information and the varied first signal.

19. The polar TX of claim 16 wherein the AM information comprises a signal having a substantially sinusoid trajectory.

20. The polar TX of claim 19 wherein the RF path delay is calculated as the difference in amplitude of the substantially sinusoid trajectory at two points of variation of the variable first signal, and division of the difference by a function of the variable first signal.

21. A polar transmitter (polar TX) system comprising:
a polar TX that comprises:
a radio frequency (RF) digital to analog converter to receive processed first amplitude modulation (AM) information as a first component of an RF transmission signal for broadcast;
oscillator circuitry configured to receive a signal that comprises a combination of both phase modulation information from a baseband signal, and a variable first signal that is configured to be varied for calculation of RF path delay and IQ phase imbalance, to provide phase modulation information as a second component of the RF transmission signal and to further provide an Inphase local oscillator (LO_I) signal and a quadrature phase local oscillator (LO_Q) signal;
a feedback receiver (FBR) that is configured to receive the RF transmission signal, the LO_I signal and the LO_Q signal, the FBR comprising:
at least one mixer configured to mix the RF transmission signal with the LO_I signal and the LO_Q signal and provide a plurality of mixer output signals, processing circuitry configured to derive the AM information and the phase information from the plurality of mixer output signals, and
measuring circuitry configured to measure the AM information and the phase information, as the variable first signal is varied, to concurrently determine both the RF path delay as a function of variation of the variable first signal, and the IQ phase imbalance as a function of the amplitude of the variable first signal as the variable first signal is varied.

22. The Polar TX system of claim 21 wherein the measuring circuitry further derives at least a second AM information from at least one of the mixer output signals, varies the variable first signal and measures the variation of the second AM information as the variable first signal is varied to determine the RF path delay and the IQ phase imbalance.

23. The polar TX system of claim 21 wherein the RF path delay is calculated by the difference in amplitude of a signal having a substantially sinusoid trajectory at two points of variation of the variable first signal and the division of the difference by a function of the variable first signal.

* * * * *

UNITED STATES PATENT AND TRADEMARK OFFICE
CERTIFICATE OF CORRECTION

PATENT NO. : 9,954,626 B2
APPLICATION NO. : 15/231379
DATED : April 24, 2018
INVENTOR(S) : Belitzer et al.

Page 1 of 1

It is certified that error appears in the above-identified patent and that said Letters Patent is hereby corrected as shown below:

In the Claims

In Column 16, Line 37, after "signal;", insert --and--

Signed and Sealed this
Twenty-eighth Day of January, 2020

Andrei Iancu
*Director of the United States Patent and Trademark Office*